United States Patent [19]
Ishii et al.

[11] Patent Number: 5,541,985
[45] Date of Patent: Jul. 30, 1996

[54] PORTABLE ELECTRONIC DEVICE HAVING AN EXTERNAL I/O UNIT AND POWER SOURCE INTEGRAL THEREWITH

[75] Inventors: Hidenori Ishii, Ichinomiya; Kiyoshi Tsuzuki, Chita-gun, both of Japan

[73] Assignee: Nippondenso Co., Ltd., Kariya, Japan

[21] Appl. No.: 155,786

[22] Filed: Nov. 23, 1993

[30] Foreign Application Priority Data

Nov. 27, 1992 [JP] Japan .................... 4-318367
Nov. 27, 1992 [JP] Japan .................... 4-318368

[51] Int. Cl.⁶ ............... H04M 15/00; H04M 17/00; G06F 17/60; G06F 5/00
[52] U.S. Cl. .................. 379/111; 379/112; 379/114; 379/144; 379/357; 235/380; 235/382; 235/379
[58] Field of Search ................... 379/111, 112, 379/114, 144, 357, 130–132, 58; 235/380, 382, 379; 455/89, 90, 38.3, 343

[56] References Cited

U.S. PATENT DOCUMENTS

| | | | |
|---|---|---|---|
| 4,868,846 | 9/1989 | Kemppi | 379/144 |
| 4,900,902 | 2/1990 | Sakakibara | 379/144 |
| 4,907,257 | 3/1990 | Asano | 379/144 |
| 4,954,072 | 9/1990 | Zimmerman | 425/549 |
| 5,105,074 | 4/1992 | Nara | 235/380 |
| 5,109,540 | 4/1992 | Dzung | 455/89 |
| 5,119,414 | 6/1992 | Izumi | 379/357 |
| 5,138,650 | 8/1992 | Stahl | 379/114 |
| 5,157,247 | 10/1992 | Takahira | 235/380 |
| 5,168,151 | 12/1992 | Nara | 235/382 |
| 5,247,164 | 9/1993 | Takahashi | 235/380 |
| 5,266,782 | 11/1993 | Alanara | 379/144 |
| 5,285,055 | 2/1994 | Oonakahara | 235/380 |
| 5,317,247 | 5/1994 | Chang | 455/89 |
| 5,335,276 | 8/1994 | Thompson | 455/89 |

FOREIGN PATENT DOCUMENTS

| | | |
|---|---|---|
| 148458 | 7/1985 | European Pat. Off. |
| 901211 | 5/1990 | Germany |
| 4192948 | 7/1992 | Japan |
| 4-48309 | 8/1992 | Japan |
| 4211815 | 8/1992 | Japan |

*Primary Examiner*—Stephen Chin
*Assistant Examiner*—Vijay Shankar
*Attorney, Agent, or Firm*—Cushman, Darby & Cushman

[57] ABSTRACT

An IC card reader-writer is integrated with a battery pack 15. This IC card reader-writer 16 has a control terminal CNT and a power supply control switch 30. A portable phone unit sends power-on/off signals, which are received by the control terminal CNT to turn on and off the power supply control switch 30 to control power supply from the battery 18 to the IC card reader-writer 16. The CPU 24 of the IC card reader-writer 16 controls power supply in such a manner that power is supplied to the IC card 22 only when access to the IC card 22 is necessary and stopped when access to the IC card 22 is unnecessary.

19 Claims, 11 Drawing Sheets

PORTABLE ELECTRONIC DEVICE HAVING AN EXTERNAL I/O UNIT AND POWER SOURCE INTEGRAL THEREWITH

BACKGROUND OF THE INVENTION

1. Field of the Invention

This invention relates to a portable electronic device constructed so that an IC card reader-writer integrated with a battery pack can be attached to the portable electronic device main unit.

2. Description of the Related Art

In portable electronic devices, such as portable phones and videorecorders, power is supplied from a detachable battery pack. In these portable electronic devices, the battery pack needs to be detached for recharge after its capacity has been exhausted. Therefore, an important technical challenge in recent years has been to minimize power consumption to extend the battery life and, thus, the operating time of the portable electronic device.

Attempts are made to combine a portable electronic device and an IC card, to create new applications for portable electronic devices. For example, portable phones, whose service has been expanding dramatically in recent years, can only be used by individual users. However, if they can also be used as public phones, their application would further be expanded. It is believed that the use of IC cards instead of prepaid telephone cards would enable portable phones to be used as public phones. By using the memory of IC cards, which is significantly larger than that of magnetic cards, it is also possible to find new applications that were previously unimaginable.

For this purpose, an IC card reader-writer needs to be connected to the portable phone so that its memory can be accessed. However, if an IC card reader-writer is integrated with the portable phone unit, the portable phone unit would be too expensive for conventional users who use portable phones for individual purposes only and who do not need an IC card reader-writer. Also, the total power consumption would be higher than conventional portable phones because the battery consistently supplies power to the IC card reader-writer although the IC card reader-writer is not in use, which shortens the battery life and, thus, the operating time of the portable phone.

SUMMARY OF THE INVENTION

It is therefore an object of the present invention to provide a portable electronic device which may be attached with an IC card reader-writer or other external connecting devices by user's option.

It is a further object of the present invention to provide a portable electronic device which enables users to attach a battery pack and an IC card reader-writer to the portable electronic device unit simultaneously in a single action.

According to the present invention, the IC card reader-writer is integrated with the battery pack. Therefore, the IC card reader-writer integrated with the battery pack should only be attached to the portable electronic device unit when the IC card reader-writer is to be used, and a conventional type of battery pack without an IC card reader-writer should only be attached to the portable electronic device unit when the IC card reader-writer is not to be used. Alternatively, other external connecting devices may be attached to the portable electronic device unit. In this case, the portable electronic device unit decides which external connecting device is attached to the portable electronic device unit and effects a predetermined process according to that external connecting device. This enables the portable electronic device to be used for various purposes, significantly expanding the field of its application. Also, since the IC card reader-writer is integrated with a battery pack, the battery pack and the IC card reader-writer can be attached to the portable electronic device unit simultaneously in a single action. In addition, the portable electronic device main unit sends power supply control signals to the external connecting device attached to the portable electronic device unit, to control power supply to the external connecting device, making it possible to stop power supply to the external connecting device or to switch to a power-saving mode when the external connecting device is not to be used, thereby extending the battery life.

DETAILED DESCRIPTION OF THE PREFERRED EMBODIMENTS

Figure 1:
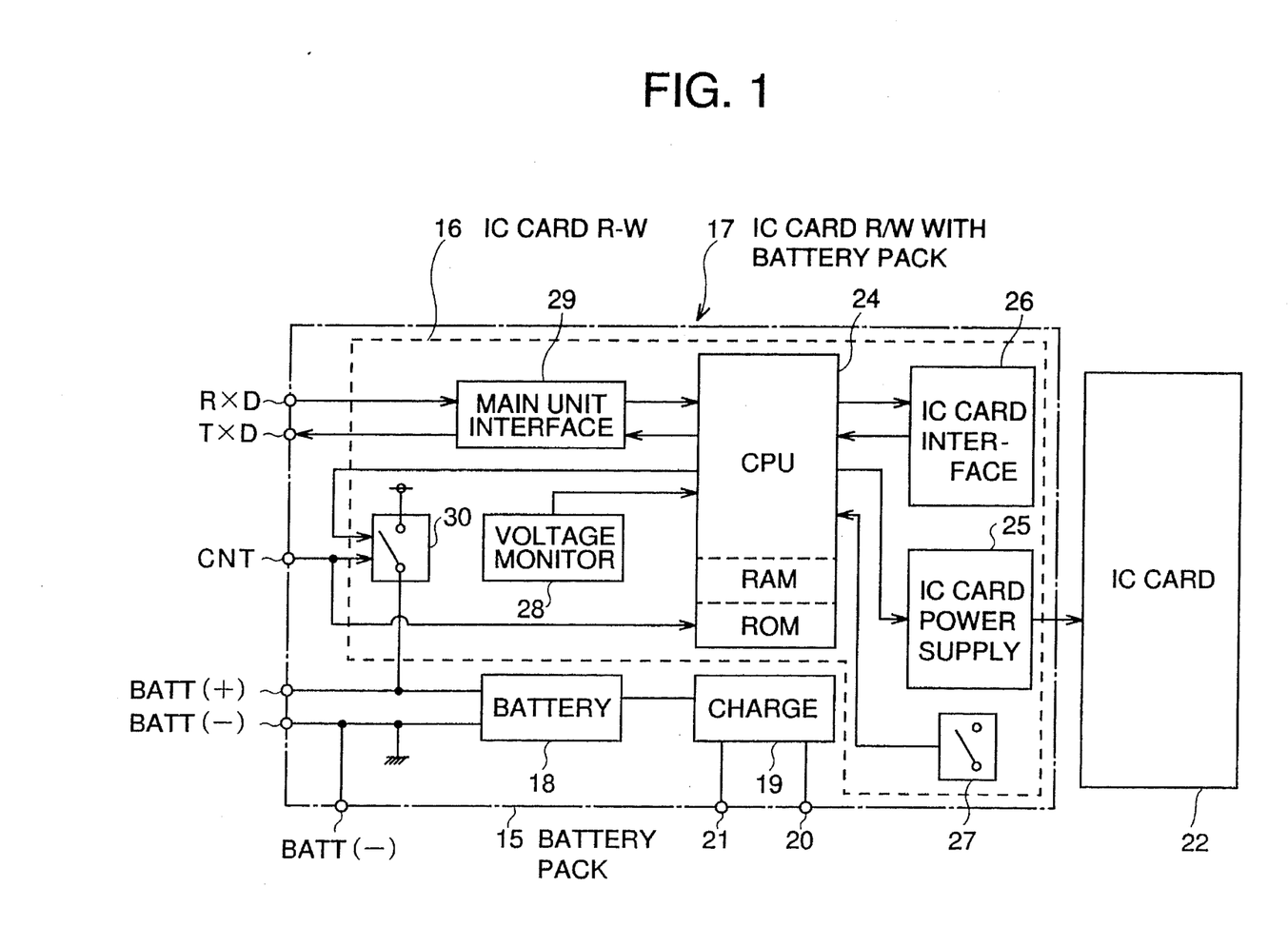
FIG. 1 is an electric wiring diagram showing the electric design of an IC card reader-writer integrated with a battery pack according to the present invention.
Figure 2:
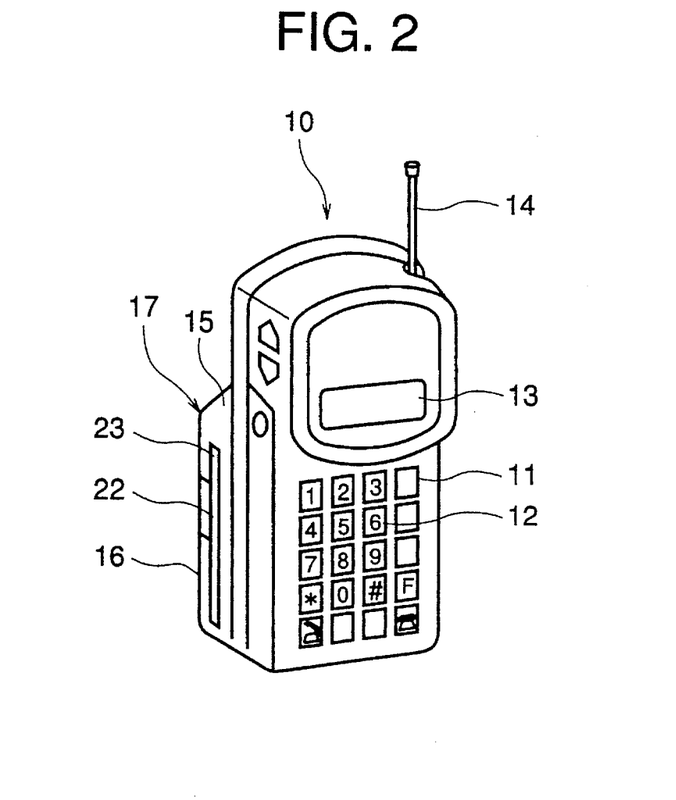
FIG. 2 is a perspective view of a portable phone to which the present invention is applied.
Figure 3:
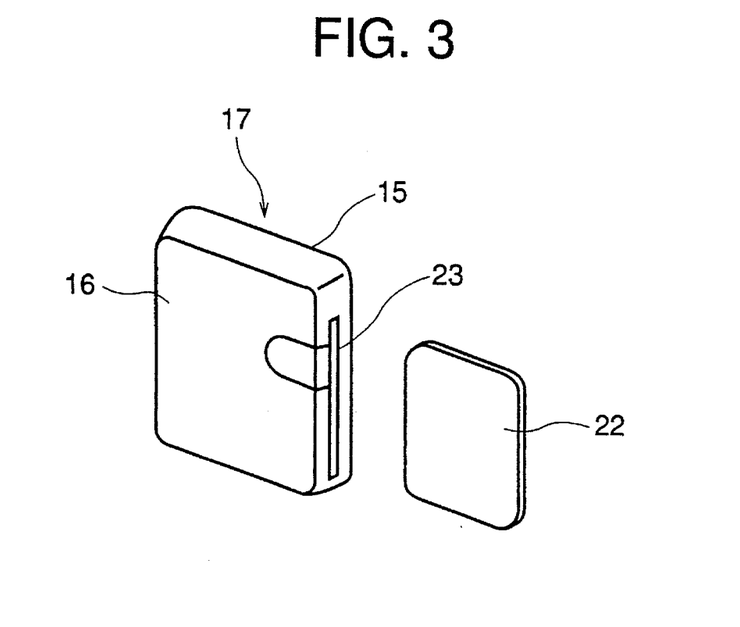
FIG. 3 is a perspective view showing the IC card reader-writer shown in FIG. 2.

The present invention applied to a portable phone is explained below, by referring to the accompanying drawings. As shown in FIG. 2, the portable electronic device unit, i.e., the portable phone unit 10, comprises a power switch 11, push-button type dial keys 12, a display 13, an antenna 14, etc. The portable phone unit 10 has a speaker and a microphone (not shown in the Figure) for speech at its top and bottom, respectively. The portable phone unit 10 further includes therein a microcomputer (CPU, ROM and RAM) for controlling phone operation. An IC card reader-writer integrated with a battery pack 17, which consists of a battery pack 15 and an IC card reader-writer 16, is detachably installed on the back of the portable phone unit 10. The reader-writer 17 is used as an external device. The IC card reader-writer 16 has a card slot 23, where an IC card 22 is to be inserted (see FIG. 3). The battery pack 15 contains a battery 18 consisting of secondary battery cells, as well as a battery charging circuit 19, as shown in FIG. 1. The battery charging circuit 19 has external recharging terminals 20 to be connected to an external recharger (not shown in the Figure) and a battery temperature monitoring terminal 21 used to monitor the temperature of the battery 18 in order to prevent overcurrent during accelerated recharge. The IC card reader-writer 16 has a microcomputer 24 (CPU, ROM and RAM), an IC card power supply circuit 25 which supplies power to the IC card 22, an IC card interface 26 which transmits data between the microcomputer (hereinafter CPU) 24 and the IC card 22, an IC card detecting switch 27 which detects whether the IC card 22 is correctly inserted, a source voltage monitoring circuit 28 which checks for a drop in the source voltage, and a unit interface 29 which transmits data between the CPU 24 and the portable phone unit 10. This unit interface 29 has two terminals RxD and TxD for transmitting data to and receiving data from the portable phone unit 10.

Output from the battery 18 mentioned above is supplied to the portable phone unit 10 through the battery terminals BATT (+) and BATT (−) of the battery pack 15, as well as to the IC card reader-writer 16 through the power supply control switch 30. To control power supply from the battery 18 to the IC card reader-writer 16, the IC card reader-writer 16 has a control terminal CNT which receives control signals, i.e., power-on/off signals (high/low level signals) from the portable phone unit 10. These signals turn on and off the power supply control switch 30.

The portable phone unit 10 also can accommodate a modem and other external devices (e.g., facsimile, battery pack without an IC card reader-writer, etc.) instead of the IC card reader-writer with a battery pack 17 at the option of users. These external devices also have a control terminal CNT for controlling power supply, and a power supply control switch which is turned on and off by input signals to this control terminal CNT.

Figure 4:
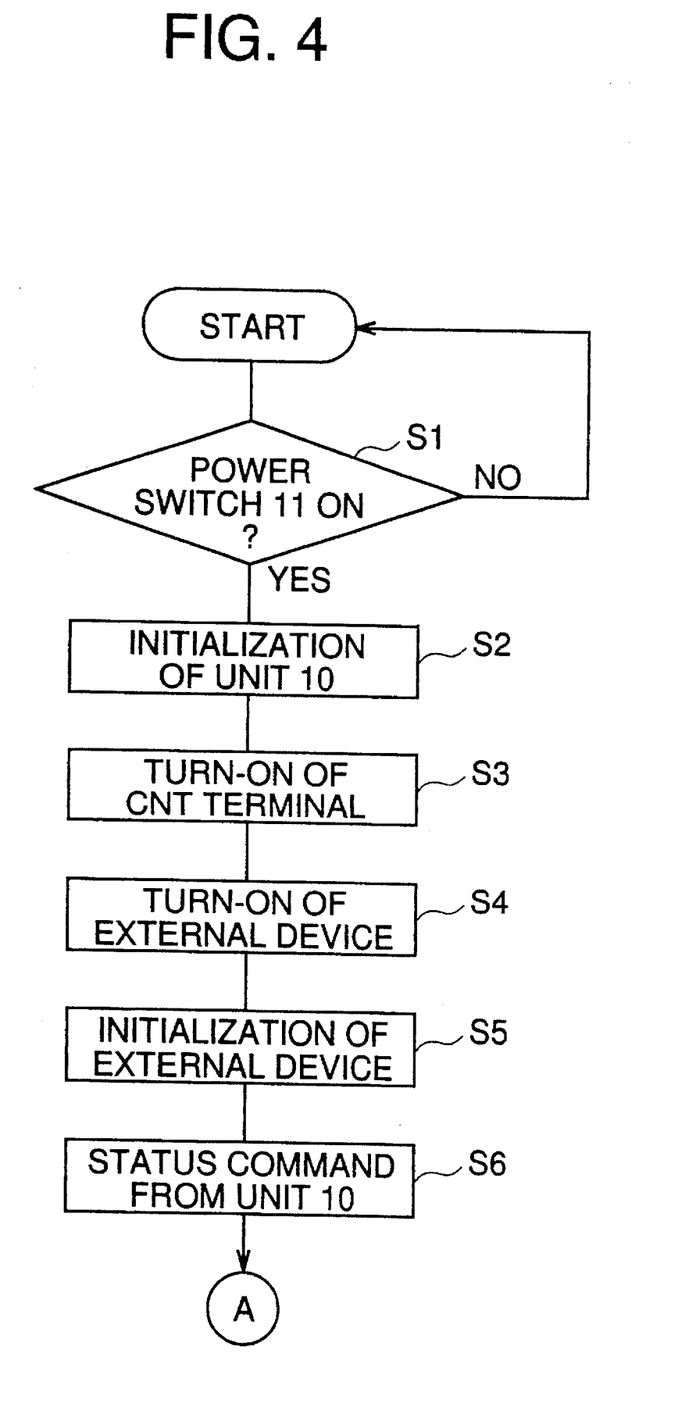
FIG. 4 is a flowchart showing the sequence of a first part of entire operation of the portable phone according to a first embodiments.
Figure 5:
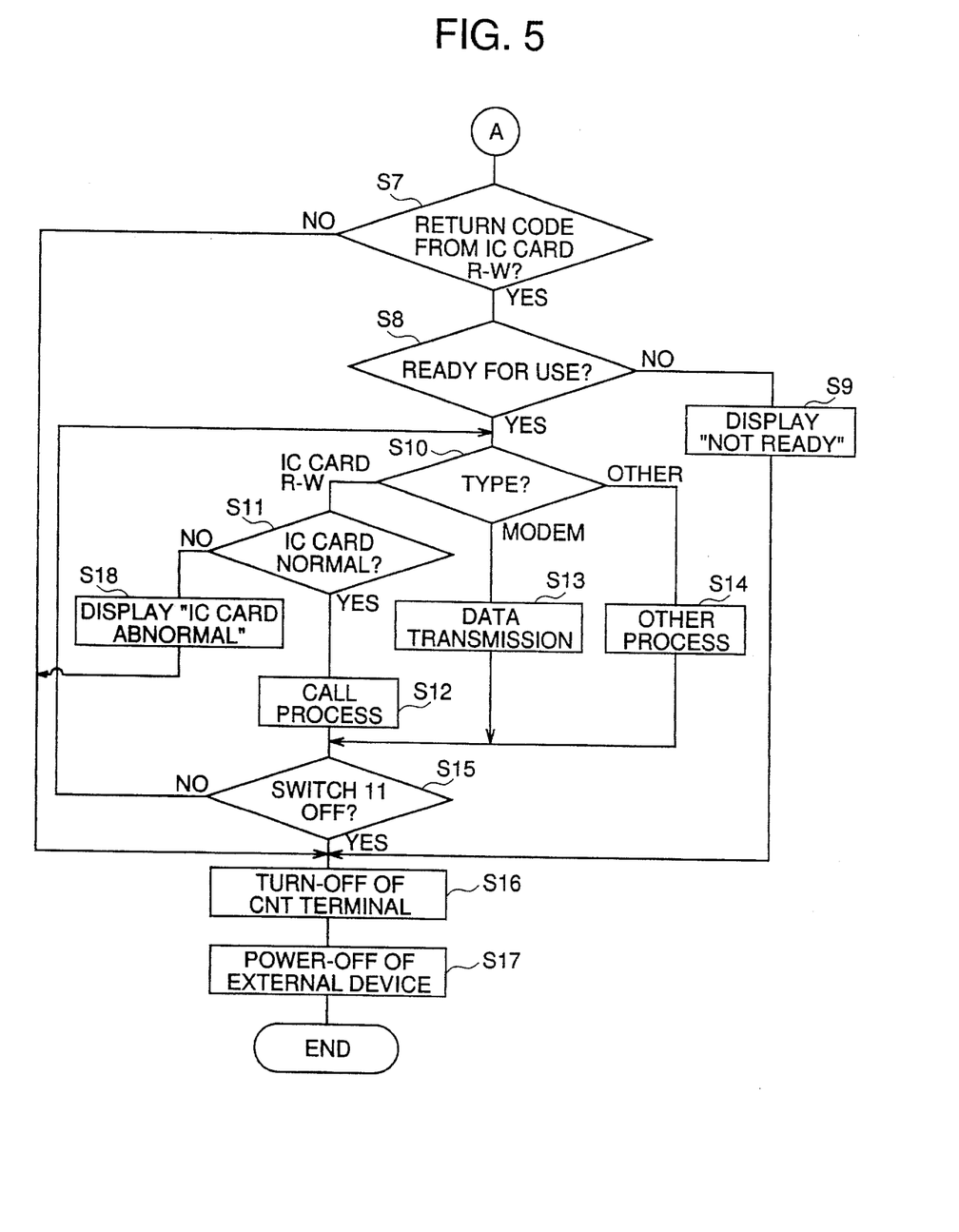
FIG. 5 is a flowchart showing the sequence of a second part of entire operation of the portable phone according to the first embodiment.

The control sequence of the entire operation of the portable phone, which is controlled by the microcomputer in the phone, is explained below, by referring to the flowcharts in FIGS. 4 and 5. When the power switch 11 of the portable phone unit 10 is turned on, the operation proceeds from step S1 to step S2, where the portable phone unit 10 is initialized. Next, in step S3, the portable phone unit 10 sends a power-on signal (high level signal) to the control terminal CNT of the external device (either the IC card reader-writer 16, modem, or other external connecting devices) which is attached to the portable phone unit 10. This signal turns on the power supply control switch to start power supply from the battery contained in the external device to that external device in step S4. Then, after the external device is initialized in step S5, the portable phone unit 10 sends a status command to the external device through terminal RxD in step S6.

Next, in step S7, it is checked whether the portable phone unit 10 has received a return code from the IC card reader-writer 16. If it has not, the sequence jumps to step S16, where the portable phone unit 10 sends a power-off signal (low level signal) to the control terminal CNT of the external device to turn off the power supply control switch, which, in turn, forcibly stops power supply from the battery 18 to the external device in Step S17. On the other hand, if it is found in step S7 that the portable phone unit 10 has received a return code from the IC card reader-writer 16, the return code is checked to find out whether the external device is ready for use in step S8. If the external device is found not to be ready, step S9 is invoked, where a message "NOT READY" is indicated on the display 13, while the portable phone unit 10 sends a power-off signal (low level signal) to the control terminal CNT of the external device in step S16 to turn off the power supply control switch, which, in turn, forcibly stops power supply to the external device in step S17.

If the external device is found to be ready, step S10 is invoked, where decision is made whether the external device attached to the portable phone unit 10 is "IC CARD READER-WRITER," "MODEM," or "OTHER EXTERNAL DEVICE." Step S10 functions as deciding means to decide which external device is attached to the portable phone unit 10. If the result in step S10 is "IC CARD READER-WRITER," the sequence continues to step S11, where the IC card 22 is checked for any abnormality in reference to data from CPU 24 of IC card reader-writer 16. If the data on the IC card 22 is abnormal or if the IC card 22 has not been inserted in the IC card reader-writer 16, the sequence jumps to step S18, where a message "IC CARD ABNORMAL" is indicated, then to step S16, where the portable phone unit 10 sends a power-off signal to the control terminal CNT of the IC card reader-writer 16 to turn off the power supply control switch 30, which, in turn, forcibly stops power supply from the battery 18 to the IC card reader-writer 16 in step S17.

If the IC card 22 is found to be normal in step S11 above, step S12 is invoked, where a "call" process is carried out. If the power switch 11 of the portable phone unit 10 is turned off after the call is over, the sequence continues from step S15 to step S16, where the portable phone unit 10 sends a power-off signal to the control terminal CNT of the IC card reader-writer 16 to turn off the power supply switch 30, which, in turn, forcibly stops power supply from the battery 18 to the IC card reader-writer 16 in step S17.

If a modem is found to be attached to the portable phone unit 10 in step S10, the sequence jumps to step S13, where a "data transmission" process is carried out through the modem. If any other external device is found to be attached to the portable phone unit 10, another process is carried out in step S14 using that external device. If the power switch 11 of the portable phone unit 10 is turned off after this process is over, the sequence continues from step S15 to step S16, where the portable phone main unit 10 sends a power-off signal to the control terminal CNT of the external device to turn off the power supply control switch, which, in turn, forcibly stops power supply to the external device in step S17. In this sequence, steps S12 through S14 function as control means to effect a process according to the external device attached to the portable phone unit 10.

Figure 6:
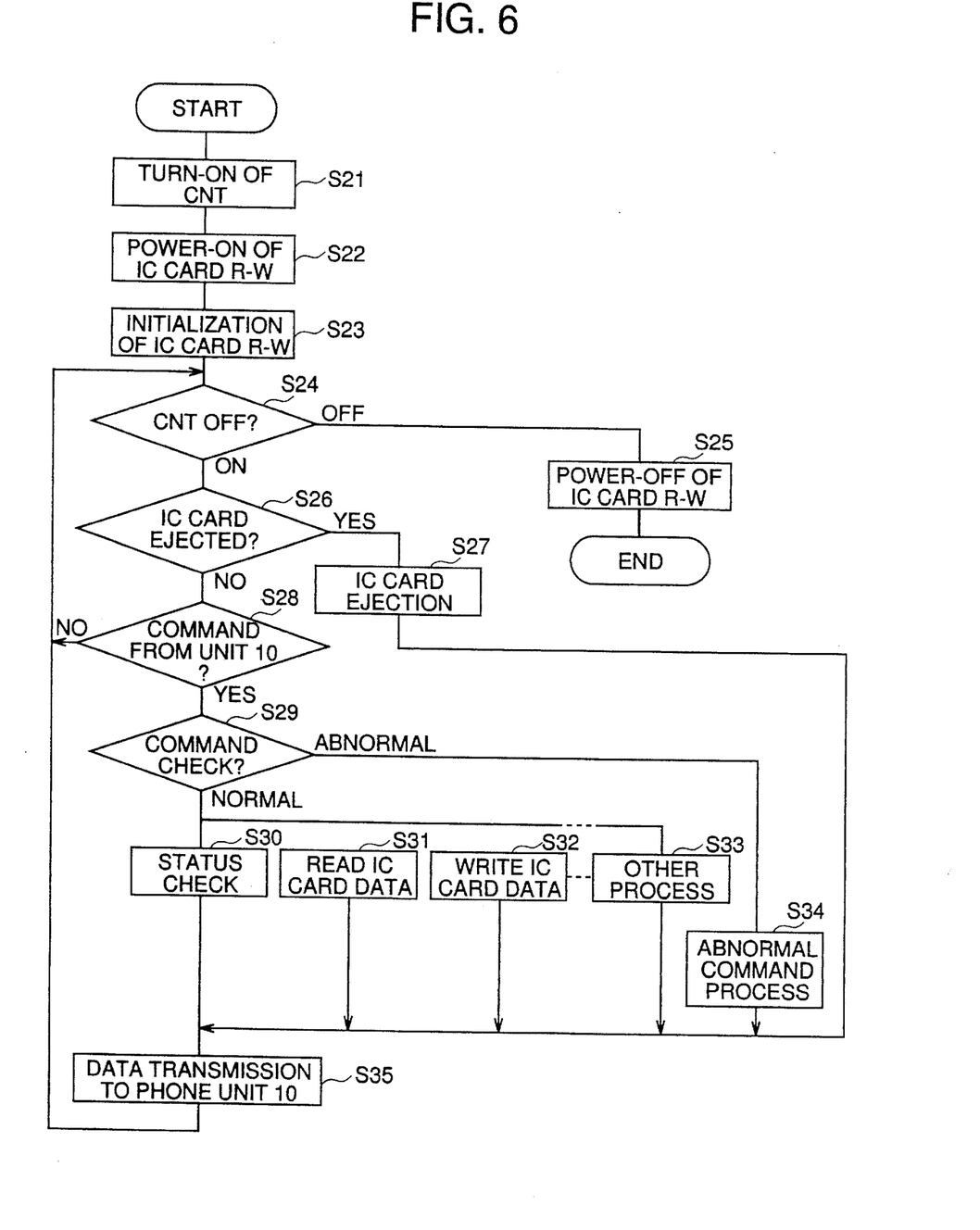
FIG. 6 is a flowchart showing the sequence of control of the IC card reader-writer according to the first embodiments.
Figure 7:
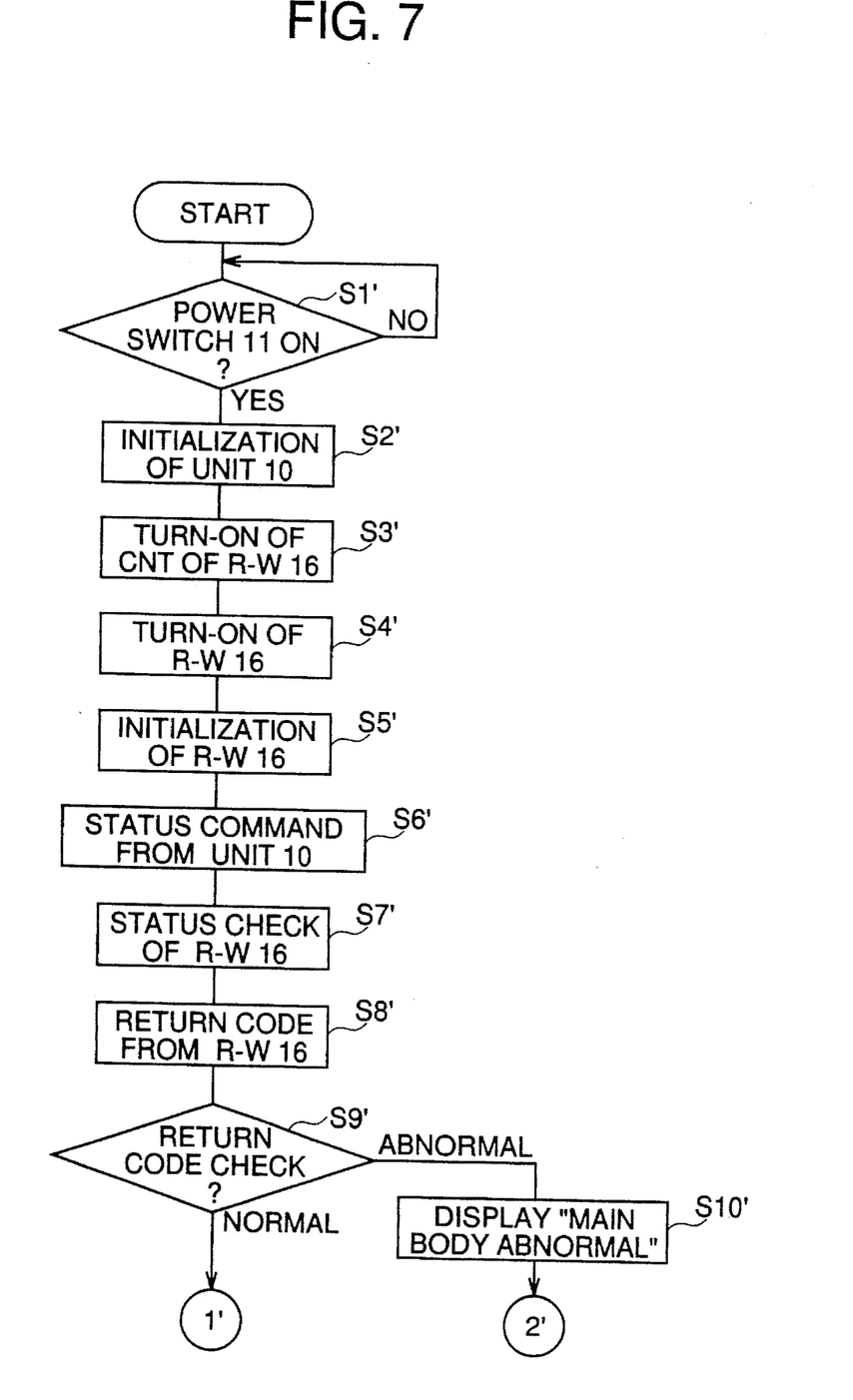
FIG. 7 is a flowchart showing the sequence of a first part of operation of the portable phone according to a second embodiment.
Figure 8:
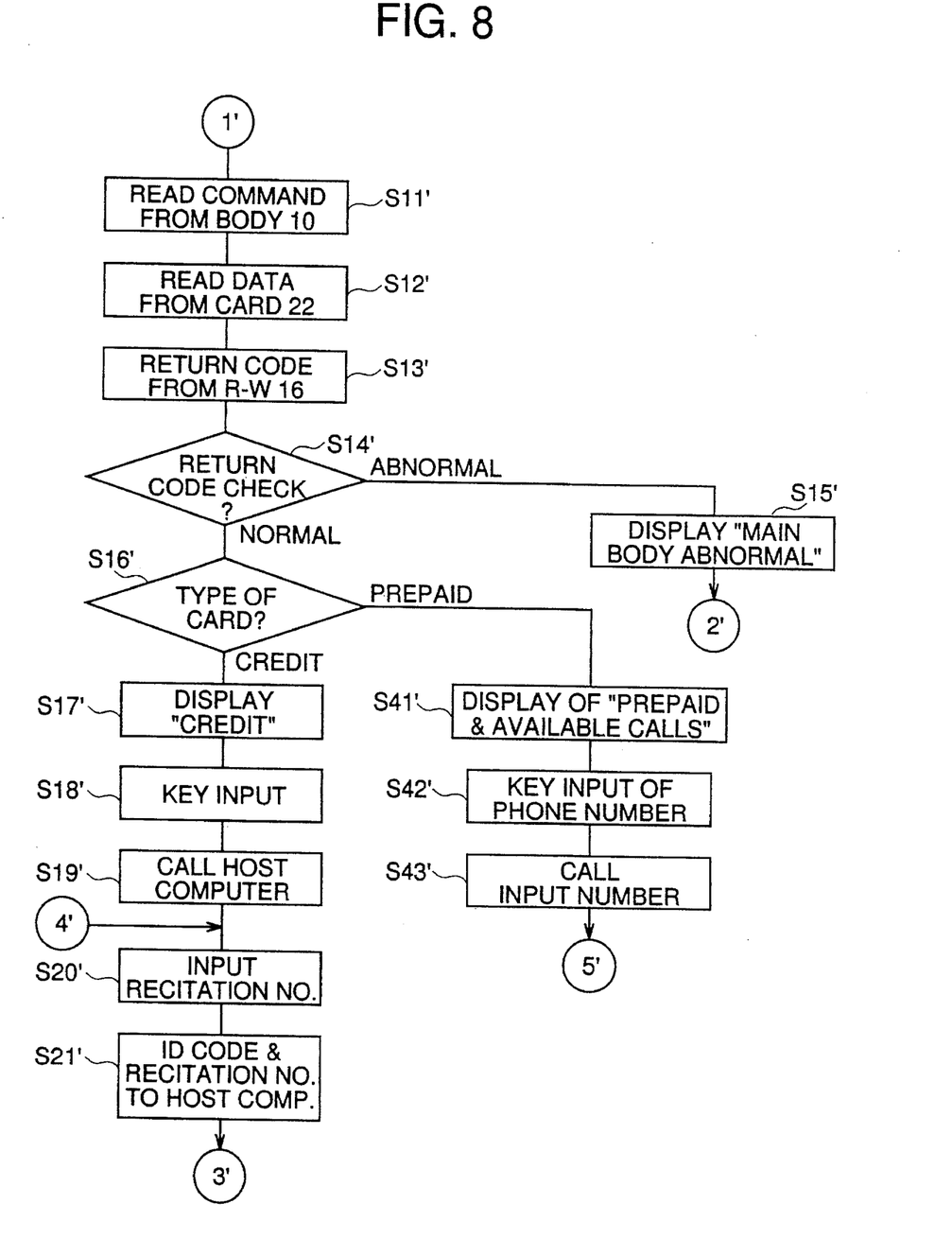
FIG. 8 is a flowchart showing the sequence of a second part of entire operation of the portable phone according to the second embodiments.

In the following paragraphs, the sequence of control by the microcomputer (CPU) of the IC card reader-writer 16 is explained by referring to the flowchart in FIG. 6. When the control terminal CNT receives a power-on signal in step S21, the power supply control switch 30 is turned on to start power supply from the battery 18 to the IC card reader-writer 16 in step S22, followed by the initialization of the IC card reader-writer 16 in step S23. Later, when the control terminal CNT receives a power-off signal, the power supply control switch 30 is turned off to forcibly stop power supply from the battery 18 to the IC card reader-writer 16 in steps S24 and S25.

If the input to the control terminal CNT stays on, step S26 is followed to check whether the IC card 22 has been ejected or not. If the IC card 22 has been ejected, the sequence continues to step S27, where an "IC card ejection" process is carried out. Then, data is sent to the portable phone unit 10 in step S35, and a message is indicated on the display 13. If the IC card 22 has not been ejected, the sequence jumps from step S26 to S28 to check whether a command has been received from the portable phone unit 10. If a command has not been received, the sequence returns to step S24, which has already been mentioned. If a command has been received, step S29 is invoked to check whether the command is normal or abnormal. If the command is found to be abnormal, step S34 is followed, where an "abnormal command" process is carried out, then data is sent to the portable phone unit 10 in step S35. If the command is found to be normal in step S29, a "status check" process (step S30), an "IC card 22 data read-out" process (step S31), an "IC card 22 data write-in" process (step S32), or other process (step S33) is carried out according to the command, then data is sent to the portable phone unit 10 in step S35. The sequence returns to step S24 to repeat the routine described above.

Next, a second embodiment of the present invention applied to a portable phone is explained below by referring to the flowcharts in FIGS. 7 through 11 which are performed mostly by the microcomputer in the portable phone. When the power switch 11 of the portable phone unit 10 is turned on, the operation proceeds from step S1' to step S2', where the portable phone unit 10 is initialized. Next, in step S3', the portable phone unit 10 sends a power-on signal (high level signal) to the control terminal CNT of the IC card reader-writer 16. This signal turns on the power supply control switch 30 to start power supply from the battery 18 to the IC card reader-writer 16 in step S4'. Then, after the IC card reader-writer 16 is initialized in step S5', the portable phone unit 10 sends a status command to the IC card reader-writer 16 through terminal RxD in step S6'. A status check process is then carried out by the IC card reader-writer 16 in step S7'.

Next, in step S8', the IC card reader-writer sends a return code to the portable phone unit 10 through terminal TxD. Then, in step S9', it is checked whether the return code is normal. If the return code is abnormal, a message "MAIN UNIT ABNORMAL" is indicated on the display 13 in step S10', and the portable phone unit 10 sends a power-off signal (low level signal) to the control terminal CNT of the IC card reader-writer 16 in step S61' to turn off the power supply control switch 30, which, in turn, forcibly stops power supply from the battery 18 to the IC card reader-writer 16 in step S62', while the power switch 11 of the portable phone unit 10 is automatically turned off in step S63'.

If the return code is found to be normal in step S9' mentioned above, the sequence jumps to step S11', where the portable phone unit 10 sends a "read" command to the IC card reader-writer 16, and the CPU 24 of the IC card reader-writer 16 reads data from the IC card 22 in step S12'. Next, in step S13, the IC card reader-writer 16 sends a return code to the portable phone unit 10. Then, in step S14', it is checked whether the return code is normal If the return code is abnormal, a message "MAIN UNIT ABNORMAL" is indicated on the display 13 in step S15, and the portable phone unit 10 sends a power-off signal to the control terminal CNT of the IC card reader-writer 16 in step S61' to turn off the power supply control switch 30, which, in turn, forcibly stops power supply from the battery 18 to the IC card reader-writer 16 in step S62, while the power switch 11 of the portable phone unit 10 is automatically turned off in step S63'.

If the return code is found to be normal in step S14' mentioned above, the sequence jumps to step S16', where it is checked whether the IC card 22 is "CREDIT CARD" or "PREPAID CARD." If the result is "CREDIT CARD," the sequence continues to step S17', where a message "CREDIT CARD" is indicated on the display 13.

In this state, if the user enters a telephone number using the dial keys 12 in step S18', the portable phone unit 10 automatically calls the host computer (not shown in the Figure) of the credit company to connect to the host computer in step S19'. Then, after the user enters a personal authorization number (recitation number) using the dial keys 12 in step S20', the portable phone main unit 10 sends the ID code and the personal authorization number to the host computer at step S21', which checks the ID code and the personal authorization number in step S22'. Next, the host computer sends a return code to the portable phone unit 10 in step S23', which is then checked to find out whether the personal authorization number is correct in step S24'.

If the personal authorization number is incorrect, the sequence continues to S25', where it is checked whether the repetition of personal authorization number errors exceeds three times. If the repetition does not exceed three times, the sequence returns to step S20' mentioned above after a message is indicated on the display 13, prompting to enter the personal authorization number in step S26'. If the repetition of personal authorization number errors exceeds three times, the sequence jumps from step S25' to step S27', where a message "DATA ABNORMAL" is indicated, and the portable phone unit 10 sends a "lock" command to the IC card reader-writer 16 in step S28' to lock the IC card 22 in order to prevent unauthorized use at step S29', while the IC card reader-writer 16 sends a return code to the portable phone unit 10 in step S30'. This makes the portable phone unit 10 send a power-off signal to the control terminal CNT of the IC card reader-writer 16 as in step S61 to turn off the power supply control switch 30, which, in turn, forcibly stops power supply from the battery 18 to the IC card reader-writer 16 in step S62', while the power switch 11 of the portable phone unit 10 is automatically turned off in step S63'.

If the personal authorization number is found to be correct in step S24' mentioned above, the sequence jumps to step S31', where the telephone number entered in step S18' is called. After the call is connected, the number of calls counted is counted up in step S32' and indicated on the display 13 in step S33'. The number of calls counted is repeatedly calculated and indicated during the call provided that the IC card 22 is in place in steps S34' and S35'. If the IC card 22 is pulled out during the call, the sequence jumps from step S34' to step S36', where a message "IC CARD EJECTION" is indicated on the display 13, and the call is stopped forcibly in step S37'. Then, the portable phone unit 10 sends a power-off signal to the control terminal CNT of the IC card reader-writer 16 as in step S61' to turn off the power supply control switch 30, which, in turn, forcibly stops power supply from the battery 18 to the IC card reader-writer 16 in step S62', while the power switch 11 of the portable phone unit 10 is automatically turned off in step S63'.

If the call finishes while the IC card 22 is in place, the sequence jumps from step S35' to step S38' to wait the power switch 11 to be turned off. Later, when the power switch 11 is turned off, the portable phone unit 10 sends a power-off signal to the control terminal CNT of the IC card reader-writer 16 in step S61 to turn off the power supply control switch 30, which, in turn, forcibly stops power supply from the battery 18 to the IC card reader-writer 16 in step S62', while the power switch 11 of the portable phone unit 10 is automatically turned off in step S63'.

If the IC card 22 is found to be "PREPAID CARD" in step S16' mentioned above, step S41' is invoked, where a message "PREPAID CARD" and the number of calls remaining or available are indicated on the display 13. In this state, if the user enters a telephone number using the dial keys 12 as in step S42', that telephone number is called in step S43'. After the call is connected, the number of calls remaining is calculated in step S44' and indicated on the display 13 in step S45'. Next, the portable phone unit 10 sends a "write" command to the IC card reader-writer 16 in step S46', which, in turn, writes the number of calls remaining on the IC card 22 in step S47', while the IC card reader-writer 16 sends a return code to the portable phone unit 10 in step S48'. Then, in S49', it is checked whether the return code is normal. If the return code is abnormal, a message "DATA ABNORMAL" is indicated on the display 13 in step S50', and the call is stopped forcibly in step S51'. Then, the portable phone unit 10 sends a power-off signal to the control terminal CNT of the IC card reader-writer 16 in step S61' to turn off the power supply control switch 30, which, in turn, forcibly stops power supply from the battery 18 to the IC card reader-writer 16 in step S62', while the power switch 11 of the portable phone unit 10 is automatically turned off in step S63'.

If the return code is found to be normal in step S49' mentioned above, the number of calls remaining are repeatedly calculated and written on the IC card 22 during the call provided that the IC card 22 is in place in steps S52' and S53'. If the IC card 22 is pulled out during the call, the sequence jumps from step S52' to step S54', where a message "IC CARD EJECTION" is indicated on the display 13, and the call is stopped forcibly in step S55'. Then, the portable phone unit 10 sends a power-off signal to the control terminal CNT of the IC card reader-writer 16 in step S61' to turn off the power supply control switch 30, which, in turn, forcibly stops power supply from the battery 18 to the IC card reader-writer 16 in step S62', while the power switch 11 of the portable phone unit 10 is automatically turned off in step S63'.

If the call finishes while the IC card 22 is in place, the sequence jumps from step S53' to step S56' to wait the power switch 11 to be turned off. Later, when the power switch 11 is turned off, the portable phone unit 10 sends a power-off signal to the control terminal CNT of the IC card reader-writer 16 in step S61' to turn off the power supply control switch 30, which, in turn, forcibly stops power supply from the battery 18 to the IC card reader-writer 16 in step S62', while the power switch 11 of the portable phone unit 10 is automatically turned off in step S63'.

Figure 9:
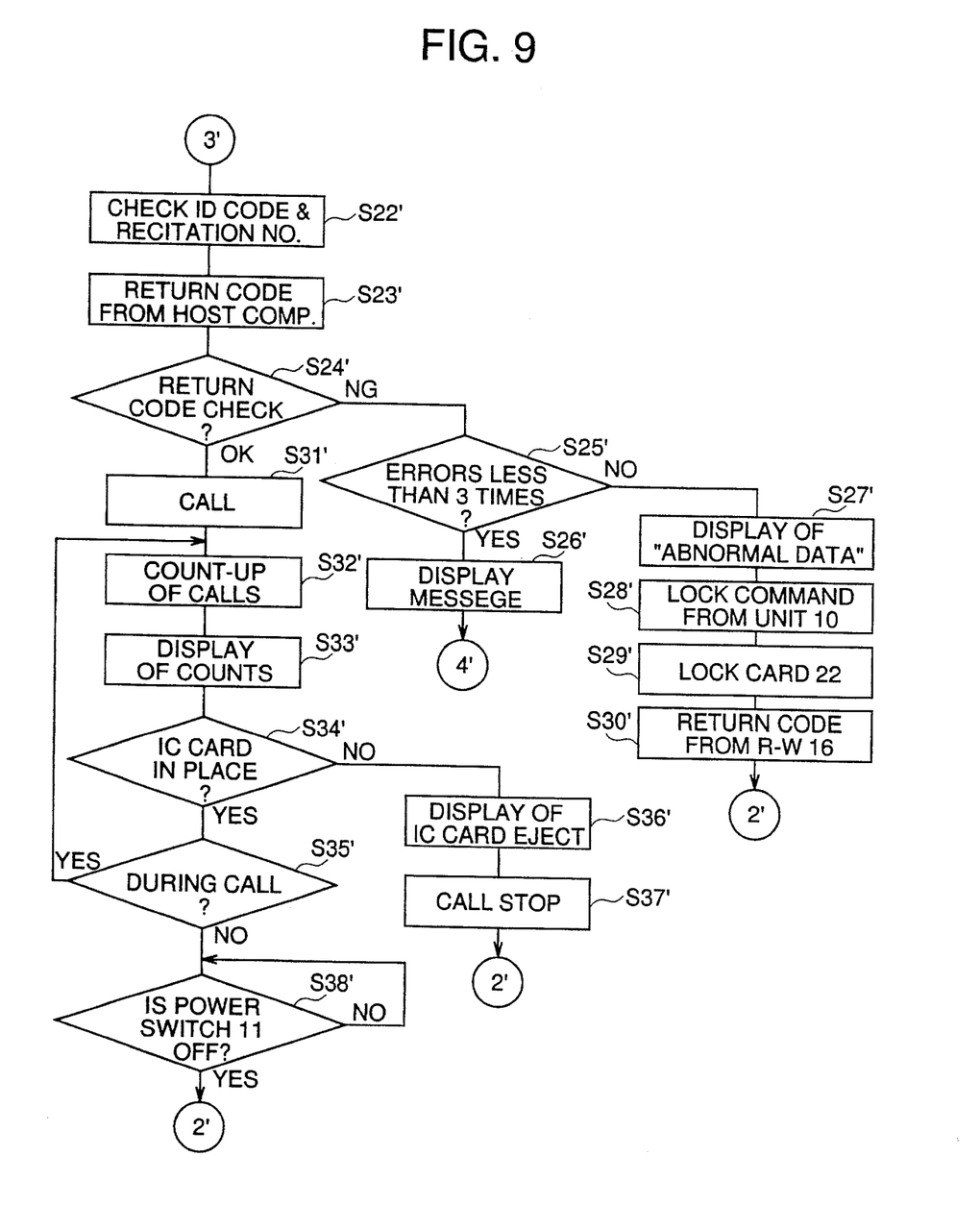
FIG. 9 is a flowchart showing the sequence of a third part of entire operation of the portable phone according to the second embodiment.
Figure 10:
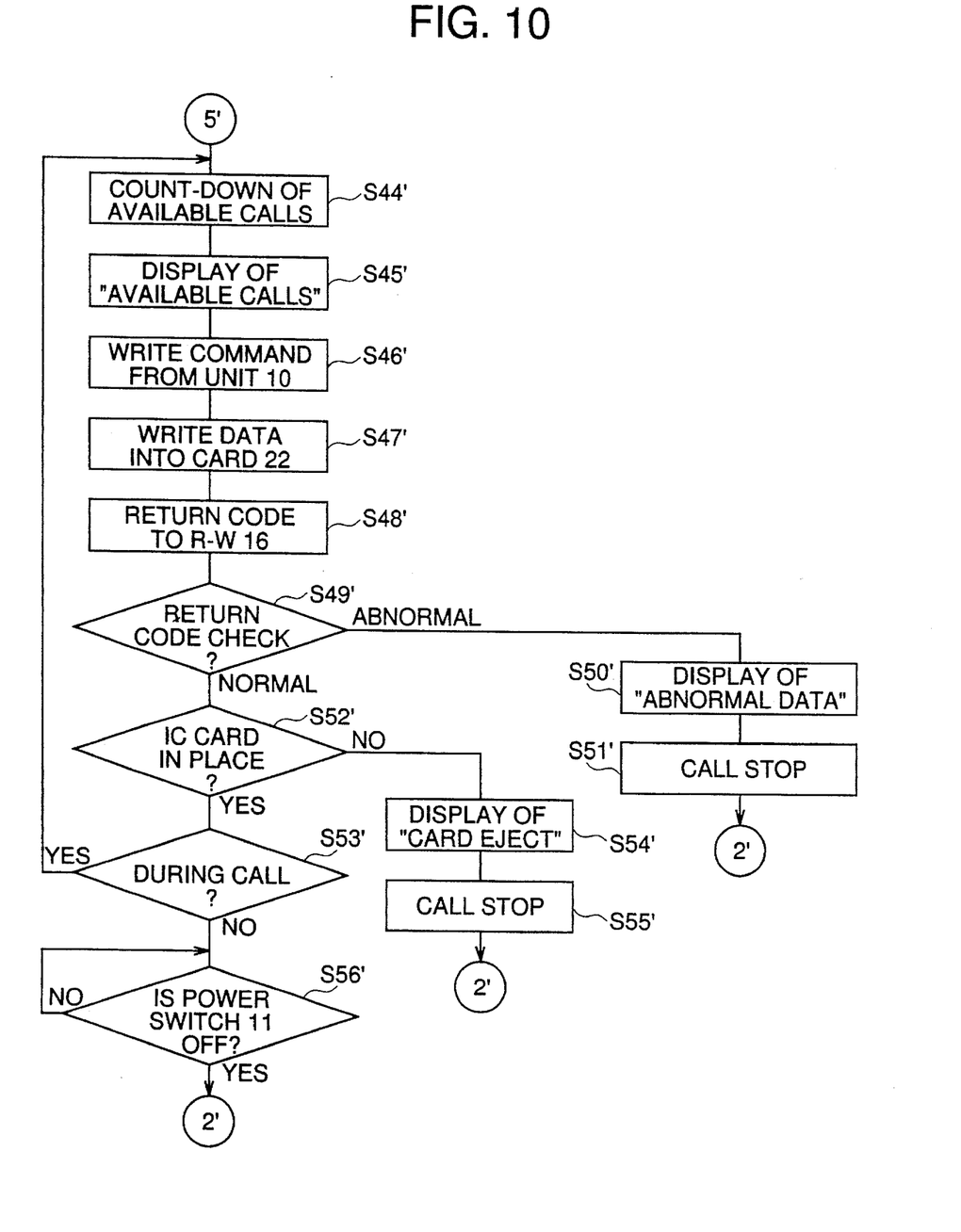
FIG. 10 is a flowchart showing the sequence of a fourth part of entire operation of the portable phone according to the second embodiment.
Figure 11:
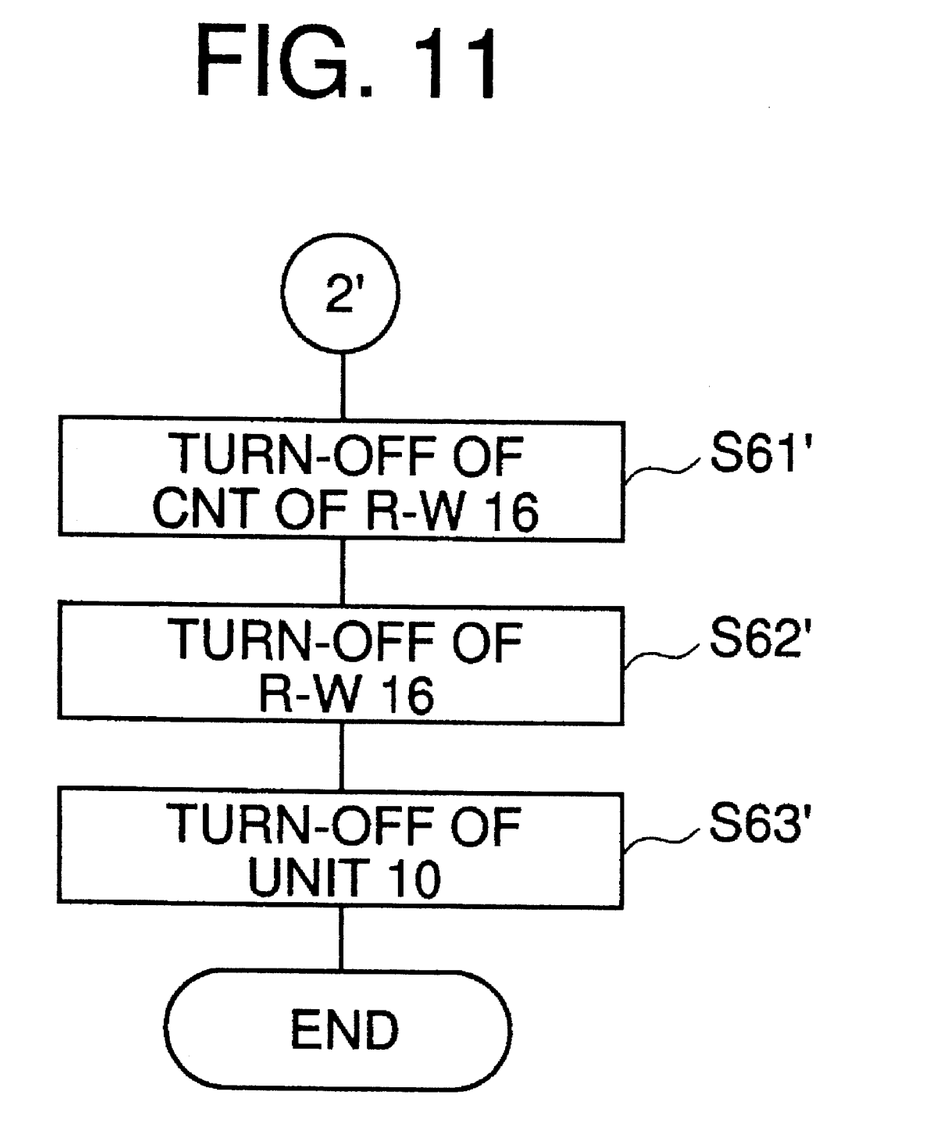
FIG. 11 is a flowchart showing the sequence of a fifth part of entire operation of the portable phone according to the second embodiment.
Figure 12:
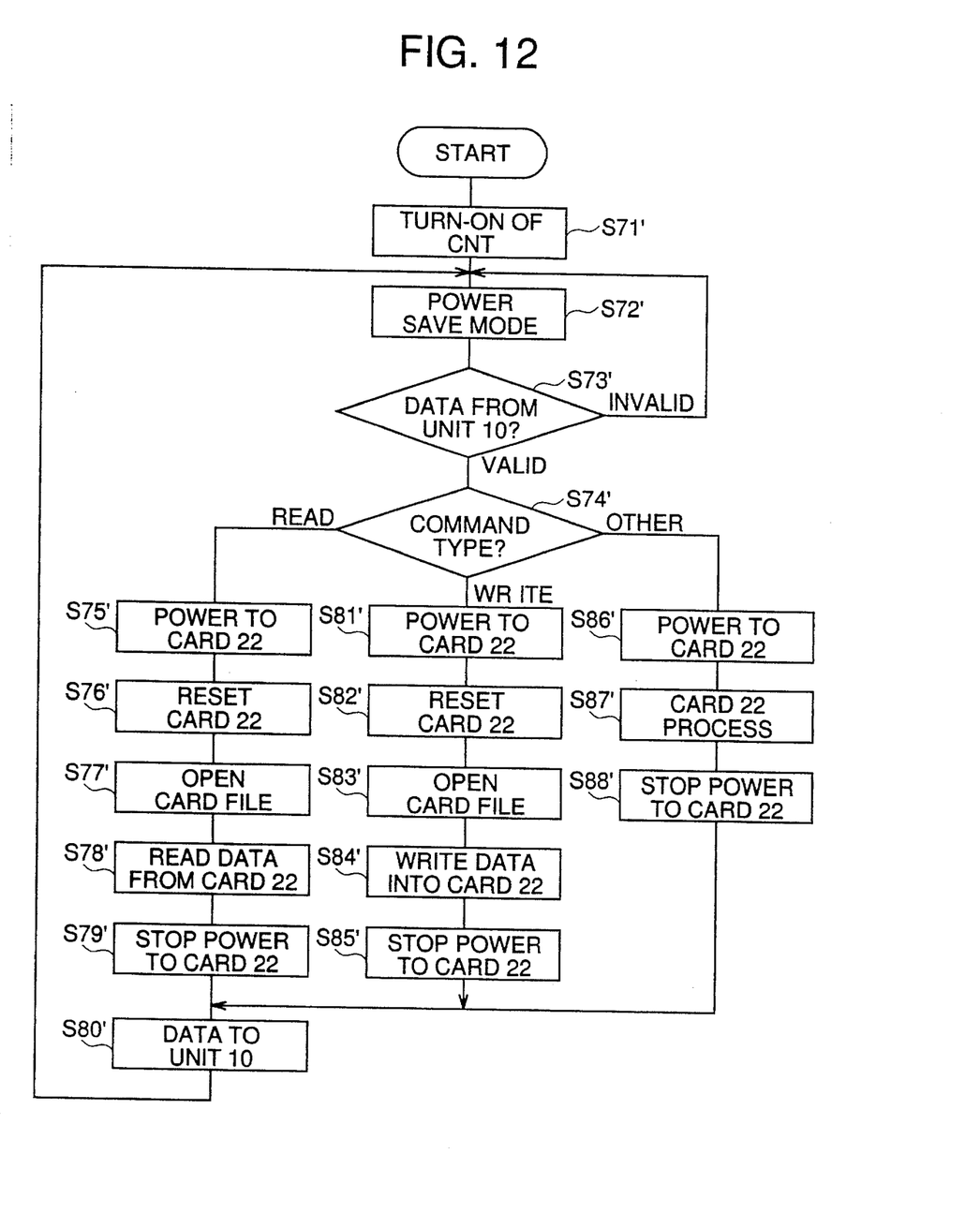
FIG. 12 is a flowchart showing the sequence of control of the IC card reader-writer according to the second embodiment.

In the following paragraphs, the sequence of control by the CPU 24 of the IC card reader-writer 16 is explained by referring to the flowchart in FIG. 9. When the control terminal CNT receives a power-on signal, the power supply control switch 30 is turned on in step S71' to start power supply from the battery 18 to the IC card reader-writer 16. In this state, however, power supply to the IC card 22 is suspended to maintain a power-saving mode in step S72'. Under this condition, it is checked whether data reception from the portable phone unit 10 is active or not in step S73'. The power-saving mode is maintained until data reception is activated.

Later, after data reception from the portable phone unit 10 is activated, the sequence proceeds to step S74', where decision is made whether the command is "READ COMMAND", "WRITE COMMAND", or any other command (hereinafter referred to as "OTHER COMMAND"). If the result is "READ COMMAND", step S75' is invoked to supply power to the IC card 22 through the IC card power supply circuit 25, and the IC card 22 is reset in step S76'. Then, the file on the IC card 22 is opened in step S77' so that data is read from the IC card 22 in step S78'. Next, after power supply to the IC card 22 is stopped in step S79', the data is sent to the portable phone unit 10 in step S80'. The sequence then returns to step S72'.

If the result in step S74' mentioned above is "WRITE COMMAND", step S81' is invoked to supply power to the IC card 22, and the IC card 22 is reset in step S82'. Then, the file on the IC card 22 is opened in step S83' so that data is written on the IC card 22 in step S84'. Next, after power supply to the IC card 22 is stopped in step S85', the data is sent to the portable phone unit 10 in step S80. The sequence then returns to step S72'.

If the result in step S74' mentioned above is "OTHER COMMAND", step S86' is invoked to supply power to the IC card 22. After a process is carried out for the IC card 22 according the "other command" in step S87', power supply to the IC card 22 is stopped in step S88', and the data is sent to the portable phone unit 10 in step S80'. The sequence then returns to step S72'.

In this embodiment, an IC card reader-writer 16 is integrated with a battery pack 15 as explained above. Therefore, the IC card reader-writer integrated with a battery pack 17 should only be attached to the portable phone unit 10 when the IC card reader-writer 16 is to be used, and a conventional type of battery pack without an IC card reader-writer should be attached to the portable phone unit 10 when the IC card reader-writer 16 is not to be used, making it possible to use the portable phone as in conventional usage. Therefore, the same portable phone unit 10 can be used for a variety of purposes, expanding the field of application of the portable phone. Also, because the portable phone unit 10 does not require an IC card reader-writer 16 to be contained in it, the portable phone unit 10 can also be merchandised as a conventional type of portable phone, for which an IC card reader-writer 16 is unnecessary, helping reduce the production cost of the portable phone unit 10.

Furthermore, since the IC card reader-writer 16 is integrated with a battery pack 15, the battery pack 15 and the IC card reader-writer 16 can be attached to the portable phone unit 10 simultaneously in a single action, which improves the ease of use and portability or space efficiency.

In addition, the IC card reader-writer 16 has a control terminal CNT and a power supply control switch 30, which enable power supply from the battery pack 15 to the IC card reader-writer 16 to be controlled according to power-on/off signals sent by the portable phone unit 10, making it possible to stop power supply from the battery 18 to the IC card reader-writer 16 or to switch to a power-saving mode when the IC card reader-writer 16 is not to be used. This reduces the power consumption of the IC card reader-writer 16, extending the life of the battery 18 and, thus, the operating time of the portable phone unit 10.

In this embodiment, the power consumption of the IC card reader-writer 16 can further be reduced since the CPU 24 of the IC card reader-writer 16 controls power supply in such a manner that power is supplied to the IC card 22 only when access to the IC card 22 is necessary and stopped when access to the IC card 22 is unnecessary.

Although the present invention is applied to a portable phone in this embodiment, it should be noted that the present invention can also be applied to various portable electronic devices other than portable phones, such as portable facsimiles, videorecorders, pocket beepers, notebook computers, portable electronic schedulers, etc.

In this embodiment, power-on/off signals sent to the control terminal CNT all synchronized with the on/off operations of the power switch 11 of the portable phone unit 10, to control power supply from the battery 18 to the IC card reader-writer 16. Obviously, however, the present invention may be applied to other portable electronic devices in such a manner that the portable electronic device main unit sends a power-off signal to the control terminal CNT whenever necessary, if the IC card reader-writer is not to be used while the portable electronic device main unit is powered on.

What is claimed is:

1. A portable electronic device comprising:
   an external device integral with a battery for supplying electric power;
   an electronic device body connectable to said external device to be supplied with the electric power from said battery;
   process control means provided in said electronic device body for performing processes which are predetermined in accordance with a type of said external device connected to said electronic device body;
   first power supply control means provided in said electronic device body for producing, when said external device is connected to said electronic device body, an output signal which controls power supply from said battery to said external device to prevent unnecessary power consumption; and
   signal transmission means for outputting a first signal generated by said process control means to said external device and for inputting a second signal generated by said external device to said process control means.

2. A device according to claim 1, wherein said signal transmission means includes deciding means for deciding which type of external device is connected to said electronic device body.

3. A device according to claim 1, further comprising:
   second power supply control means provided in said external device for controlling power supply from said battery to said external device in response to said output signal from said first power supply control means.

4. A device according to claim 3, wherein said first power supply control means produces, to said second power supply control means, an activation signal which activates said external device when said electronic device body is activated and a stop signal which stops power supply to said external device.

5. A device according to claim 4, wherein said external device includes an IC card reader-writer for reading information stored in an IC card and writing information into said IC card.

6. A device according to claim 5, wherein said IC card reader-writer includes external control means for controlling operation of said IC card reader-writer in response to a control signal produced from said process control means.

7. A device according to claim 6, wherein said external control means produces to said process control means signal arising from the operation of said IC card reader-writer.

8. A device according to claim 7, wherein said electronic device body includes a phone, and wherein said IC card reader-writer reads and writes information indicative of usage of said phone.

9. A modular electronic apparatus for an information processing device, said apparatus comprising:
   a housing connectable to said information processing device, said housing having a power connector, a data connector and an IC card connector disposed therein;
   an IC card reader/writer, disposed in said housing, for communicating with an IC card removably disposed in said IC card connector and for communicating with said information processing device separate from said modular apparatus via said data connector;
   a power supply, disposed in said housing, for supplying operative power to said information processing device and to said IC card.

10. The apparatus of claim 9, said IC card reader/writer comprising:
    a main unit interface for transmitting data to and receiving data from said information processing device;
    an IC card interface for transmitting data to and receiving data from said IC card; and
    a central processing unit for communicating with said information processing device and said IC card via said main unit interface and said IC card interface, respectively.

11. The apparatus of claim 9, further comprising:
    a power supply controller for selectively controlling power to said IC card reader/writer.

12. The apparatus of claim 11, wherein:
    said power supply controller controls said power to said IC card reader/writer responsive to a signal from said information processing device; and
    said information processing device includes a portable phone unit.

13. A device according to claim 4, wherein said first power supply control means also produces, to said second power supply control means, a power-saving signal which puts said external device in a power-saving mode.

14. A device according to claim 4, wherein said first power supply control means produces said activation signal to initiate communications with said external device and produces said stop signal to terminate communications with said external device.

15. A device according to claim 4, wherein said first power supply control means produces said stop signal responsive to an abnormal operation of said external device.

16. A device according to claim 4, wherein said first power supply control means produces said stop signal responsive to an unauthorized use of said external device.

17. A device according to claim 4, wherein said first power supply control means produces said stop signal responsive to an abnormal operation of said electronic device body.

18. A device according to claim 5, wherein said first power supply control means produces said stop signal responsive to an ejection of said IC card from said IC card reader-writer.

19. A device according to claim 4, wherein said external device includes a modem for conducting digital communications with said electronic device body.

* * * * *